United States Patent [19]
Rahman et al.

[11] Patent Number: 5,778,431
[45] Date of Patent: Jul. 7, 1998

[54] SYSTEM AND APPARATUS FOR PARTIALLY FLUSHING CACHE MEMORY

[75] Inventors: Saba Rahman; Dan S. Mudgett; Victor F. Andrade, all of Austin, Tex.

[73] Assignee: Advanced Micro Devices, Inc., Sunnyvale, Calif.

[21] Appl. No.: 575,684

[22] Filed: Dec. 19, 1995

[51] Int. Cl.$^6$ .................................................. G06F 12/12
[52] U.S. Cl. .................................... 711/135; 711/115
[58] Field of Search .................................. 395/468, 471, 395/472, 462, 442, 460; 711/141, 144, 145, 135, 115, 133

[56] References Cited

U.S. PATENT DOCUMENTS

| | | | |
|---|---|---|---|
| 4,471,429 | 9/1984 | Porter et al. | 711/144 |
| 4,713,755 | 12/1987 | Worley, Jr. et al. | 711/123 |
| 4,766,534 | 8/1988 | DeBenedictis | 395/200.58 |
| 4,847,804 | 7/1989 | Shaffer et al. | 711/119 |
| 5,119,485 | 6/1992 | Ledbetter, Jr. et al. | 711/146 |
| 5,155,824 | 10/1992 | Edenfield et al. | 711/143 |
| 5,195,089 | 3/1993 | Sindhu et al. | 370/235 |
| 5,197,144 | 3/1993 | Edenfield et al. | 711/143 |
| 5,226,144 | 7/1993 | Moriwaki et al. | 711/121 |
| 5,317,720 | 5/1994 | Stamm et al. | 711/143 |
| 5,325,504 | 6/1994 | Tipley et al. | 711/128 |
| 5,353,423 | 10/1994 | Hamid et al. | 711/143 |
| 5,355,467 | 10/1994 | MacWilliams et al. | 711/146 |
| 5,359,723 | 10/1994 | Mathews et al. | 711/122 |
| 5,363,496 | 11/1994 | Kato et al. | 711/135 |
| 5,426,765 | 6/1995 | Stevens et al. | 711/131 |
| 5,428,761 | 6/1995 | Herlihy et al. | 711/130 |
| 5,551,006 | 8/1996 | Kulkarni | 711/146 |

FOREIGN PATENT DOCUMENTS

| | | |
|---|---|---|
| 0 261 029 | 3/1988 | European Pat. Off. . |
| 0 377 296 | 7/1990 | European Pat. Off. . |
| 0 397 995 | 11/1990 | European Pat. Off. . |
| 0 428 149 A2 | 5/1991 | European Pat. Off. . |
| 0 438 808 | 7/1991 | European Pat. Off. . |
| 0 567 355 A2 | 10/1993 | European Pat. Off. . |
| 5282208 | 10/1993 | Japan . |
| 90/00285 | 1/1990 | WIPO . |

OTHER PUBLICATIONS

Patent Abstracts of Japan, vol. 018, No. 353 (P-1764), Jul. 4, 1994 & JP,A,06 089229 (PFU LTD), Mar. 29, 1994.
Jim Handy, "The Cache Memory Book—Existing Copy-Back Coherency Protocols," Academic Press, Inc., San Diego California, 1993, pp. 158–190.
Robin Edenfield, Bill Ledbetter, Jr., Ralph McGarity, "The 68040 On-Chip Memory Subsystem," The Institute of Electrical and Electronics Engineers, Inc., Feb. 1990, Computer Society International Conference (COMPCON), Spring Meeting, Los Alamitos, No. Conf. 25, pp. 264–269.
Mark Atkins, "Performance and the i860 Microprocessor," IEEE Micro, (Oct. 1, 1991), vol. 11, No. 5, pp. 24–27, 72–78.

Primary Examiner—Eddie P. Chan
Assistant Examiner—Kevin L. Ellis
Attorney, Agent, or Firm—Conley, Rose & Tayon; B. Noel Kivlin

[57] ABSTRACT

A computer system is disclosed for selectively invalidating the contents of cache memory in response to the removal, modification, or disabling of system resources, such as for example, an external memory device. The computer system includes an interface unit which defines an address window for the particular system resource. The address window is implemented through the use of a lower address register and an upper address register, which are loaded in response to a lower and upper enable address signal. An upper comparator compares each tag address with the upper address register value, and a lower comparator compares each tag address with the lower address register value. If the tag address falls within the window, it is flushed by the generation of appropriate control signal. In an alternative embodiment, the present invention can be implemented through software by instructions in microcode. As yet another alternative, the present invention can be implemented by comparing each memory window address value with the stored tag address in the cache.

8 Claims, 4 Drawing Sheets

SYSTEM AND APPARATUS FOR PARTIALLY FLUSHING CACHE MEMORY

BACKGROUND OF THE INVENTION

1. Field of the Invention

The present invention generally relates to computer systems which include a cache memory. Still more particularly, the present invention relates to a cache memory implementation in which the memory locations of the cache can be selectively flushed.

2. Description of the Relevant Art

A cache memory is a high-speed memory unit interposed in the memory hierarchy of a computer system generally between a slower system memory (and/or external memory) and a processor to improve effective memory transfer rates and accordingly improve system performance. The cache memory unit is essentially hidden and appears transparent to the user, who is aware only of a larger system memory. The cache memory usually is implemented by semiconductor memory devices having access times that are comparable to the clock frequency of the processor, while the system and other external memories are implemented using less costly, lower-speed technology.

The cache concept is based on the locality principle, which anticipates that the microprocessor will tend to repeatedly access the same group of memory locations. To minimize access times of this frequently used data, it is stored in the cache memory, which has much faster access times than system memory. Accordingly, the cache memory may contain, at any point in time, copies of information from both external and system memories. If the data is stored in cache memory, the microprocessor will access the data from the cache memory and not the system or external memory. Because of the cache memory's superior speed relative to external or system memory, overall computer performance may be significantly enhanced through the use of a cache memory.

A cache memory typically includes a plurality of memory sections, wherein each memory section stores a block or a "line," of two or more words of data. For systems based on the particularly popular model 80486 microprocessor, for example, a line consists of four "doublewords" (wherein each doubleword comprises four 8-bit bytes). Similar configurations may be used in Pentium compatible microprocessors. Each cache line has associated with it an address tag that uniquely associates the cache line to a line of system memory. When the processor initiates a read cycle to obtain data or instructions from the system or external memory, an address tag comparison first is performed to determine whether a copy of the requested information resides in the cache memory. If present, the data is used directly from the cache. This event is referred to as a cache read "hit." If not present in the cache, a line containing the requested word is retrieved from system memory and stored in the cache memory. The requested word is simultaneously supplied to the processor. This event is referred to as a cache read "miss."

In addition to using a cache memory during data retrieval, the processor may also write data directly to the cache memory instead of to the system or external memory. When the processor desires to write data to memory, an address tag comparison is made to determine whether the line into which data is to be written resides in the cache memory. If the line is present in the cache memory, the data is written directly into the line in cache. This event is referred to as a cache write "hit." A data "dirty bit" for the line is then set in an associated status bit (or bits). The dirty status bit indicates that data stored within the line is dirty (i.e., modified), and thus, before the line is deleted from the cache memory or overwritten, the modified data must be written into system or external memory.

If the line into which the data is to be written does not exist in the cache memory, the line is either fetched into the cache memory from system or external memory to allow the data to be written into the cache, or the data is written directly into the system memory. This event is referred to as a cache write "miss."

Complicating the use of cache memory is the fact that many personal computers include the capability of adding external memory on which relevant data can be stored permanently. Some external memory devices have the size and shape of a credit card and can be inserted into the computer system in a similar fashion to floppy diskettes. These cards are typically referred to as PCMCIA cards, and are used on a regular basis in portable computers to expand the available memory of these computers. Once inserted into an appropriate slot in the computer system, data then can be read from and written to the external memory card. Like a floppy disk, the memory card can be removed from the computer system at any time.

Unique problems occur, however, when using cache memory in association with a removable external memory card. The cache memory in the computer may be used to expedite accesses to several memory sources such as system memory and external memory cards. The contents of cache memory, therefore, may reflect the contents of both system and external memory. Memory cards, however, unlike system memory, can be removed from the host device during normal operations. When an operator removes a memory card, the cache contents associated with that card become invalid and should not be accessed by the central processor unit (CPU). Of particular concern is the resulting errors from replacing one memory card with another card. In this situation, the CPU may associate the cache contents pertaining to the memory card previously removed with the new card, thus creating errors as the old card's data may be completely unrelated to the new card's data.

To eliminate this potential problem, the industry has taken one of two general approaches. The first approach is to make the contents of the external memory device non-cacheable. While this approach effectively eliminates the problem, it does so at the expense of system performance by not using the cache memory for any transactions to external memory. Instead, all external memory transfers must be accomplished directly through the external memory device.

A second approach is to completely flush the cache any time an external memory device is removed from the system. Thus, once the memory card is removed, the entire contents of the cache are "flushed" (i.e., invalidated). Once again, while this approach eliminates the problem, it does so at the sake of system performance by essentially resetting the cache memory. Flushing the entire cache memory contents may be inefficient and wasteful because valid contents unrelated to the removed memory card are flushed unnecessarily. An analogous situation would be the classic case of cutting off a hand because a problem exists with a thumb.

Efficiency, therefore, would be enhanced if the cache memory contents could be selectively flushed to invalidate only those contents that have become invalid when, for example, a memory card has been removed. With such a cache memory implementation, valid and unaffected cache data would not be flushed and overall computer performance would be enhanced. Further, such a cache memory implementation would provide a valuable step in the implementation of a plug-n-play computer system, which requires the computer system to adapt on-the-fly as system components and peripheral devices are changed.

SUMMARY OF THE INVENTION

The present invention solves the shortcomings and deficiencies of the prior art by constructing a computer system capable of selectively flushing a cache memory. In the preferred embodiment, a processing unit contained in the computer system compares cache memory tag address values with the addresses assigned to an external memory device. The processing unit includes registers which provide a window of address values available in the external memory device. The registers preferably include a lower start address register and an upper end address register, which, when initiated, are loaded with the start and end values of the external memory addresses, respectively. A lower and upper comparator compares each tag address from the cache memory with the values in the lower and upper registers, respectively. If a tag address is found which has a value within the window defined by the upper and lower address registers, it is invalidated and the corresponding data is flushed from the cache memory.

As an alternative to this hardware implementation of the present invention, instructions may be written in microcode to perform a similar process. Thus, the start and end address values of the external memory device would be fetched and compared through software routines with the tag address values. An instruction to flush a particular line in the cache memory then would be generated by the processor in response to an affirmative comparison.

In yet another alternative embodiment, a bus interface unit is provided which contains a memory map of the available addresses in an external memory device. In response to removal of the external memory from the computer system, the bus interface unit sequentially cycles through each available external memory address in the memory map, requesting the cache controller to compare the memory address to tag addresses in cache memory. If a match for the external memory address is found in the tag address, the cache memory contents corresponding to that tag address are invalidated.

BRIEF DESCRIPTION OF THE DRAWINGS

Other objects and advantages of the invention will become apparent upon reading the following detailed description and upon reference to the accompanying drawings in which.

Figure 1:
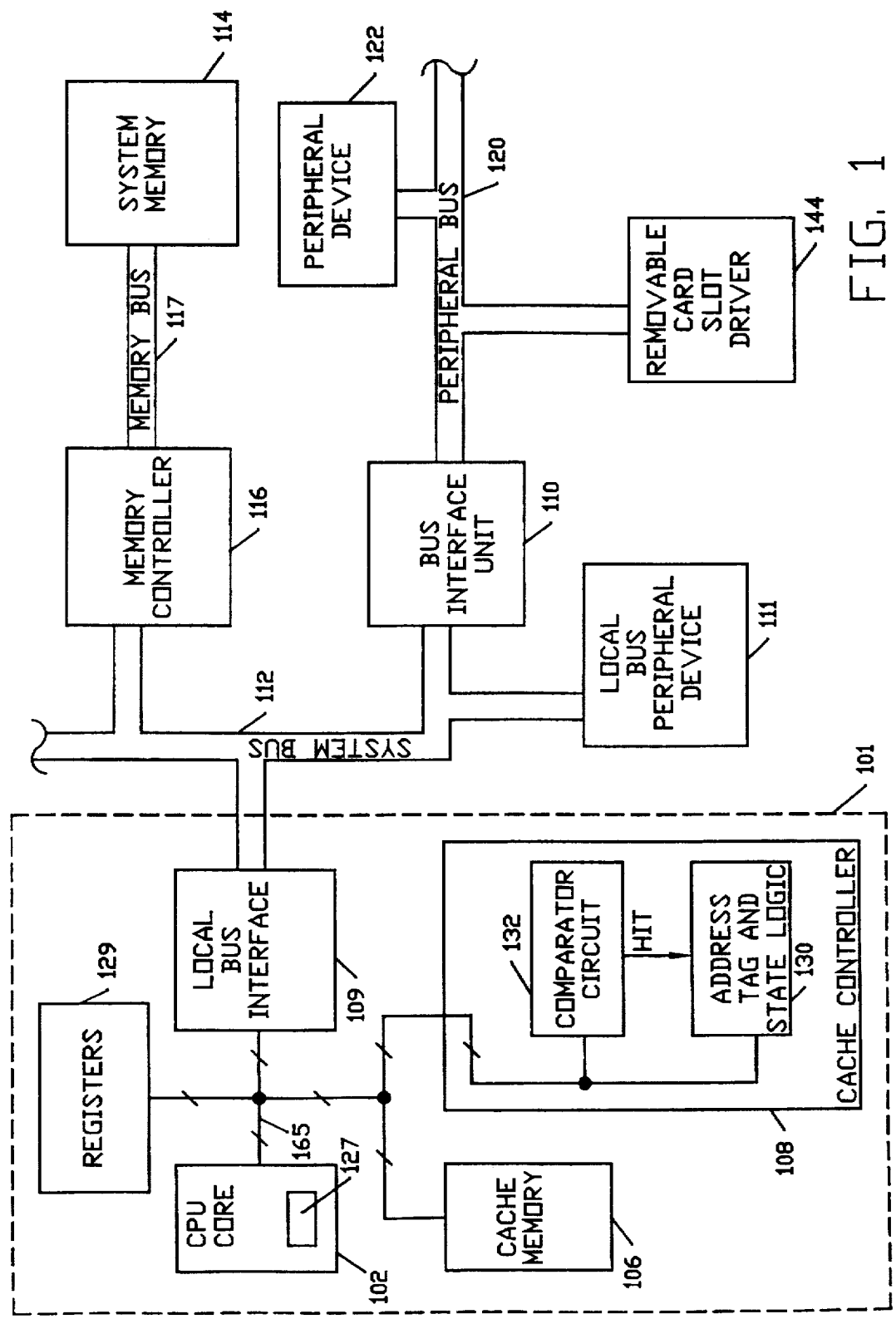
FIG. 1 is a schematic block diagram of a general computer system construction, with a cache memory internal to a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of a general computer system 100 for which the present invention is adapted. The computer system 100, in accordance with generally known conventions, includes a microprocessor or "processor" 101 which functions as the brains of the computer system 100.

Processor 101 includes a CPU core 102 coupled to a cache memory 106 by a local bus 165, a cache controller 108, and registers 129. CPU core 101, cache memory 106, cache controller 108 and registers 129 are coupled to a system bus 112 via a local bus interface 109. As one skilled in the art will understand, any of the peripheral components of the processor 101, such as cache memory 106, may be located externally from the processor 101. Similarly, other components shown as external to the processor 101 in FIG. 1 may be integrated as part of microprocessor 101. As will be understood by one skilled in the art, in such a situation the system bus 112 may form part of the CPU local bus 165.

The computer system 100 also preferably includes a bus interface unit 110, a local bus peripheral device 111, and a memory controller 116, all connected to the processor 101 via system bus 112 and local bus interface 109. Alternatively, the processor 101 may include the bus interface unit 110, the peripheral device 111, and memory controller 116 as integrated components in the processor design. Bus interface unit 110 provides an interface between an external peripheral bus 120 and the system bus 112 and orchestrates the transfer of data, address and control signals between these busses.

As shown in FIG. 1, an external system memory 114 also preferably couples to system bus 112 through memory controller 116. The memory control unit of FIG. 1 couples to the system bus 112 and to a memory bus 117 to control memory transactions between system components and system memory 114. The system memory 114 typically includes banks of dynamic random access memory (DRAM) circuits. The DRAM banks, according to normal convention, comprise the working memory of the integrated processor 100. The DRAM circuits connect to the memory controller 116 via a memory bus 117, comprised of memory address lines, memory data lines, and various control lines. In accordance with the exemplary embodiment of FIG. 1, the memory control unit 116 may also connect to a read only memory (ROM) device (not shown) via the memory bus 117. The ROM device may store the BIOS (basic input/output system) instructions for the computer system. As one skilled in the art will understand, the BIOS ROM may be located elsewhere in the computer system if desired.

An alternate peripheral device 122, such as a DMA controller or other device, also may couple to peripheral bus 120. In its illustrated form, computer system 100 embodies a single processor, single-cache architecture. It is understood, however, that the present invention may be adapted to multi-processor and/or multi-cache systems. It is further understood that a variety of other devices may be coupled to peripheral bus 120. The peripheral bus may comprise a PCI bus, an ISA bus, an EISA bus, or any other standard bus. Peripheral device 122 may be illustrative of a variety of bus mastering devices. Exemplary alternate bus masters include disk drives, CD ROM units, and local area network (LAN) devices.

The CPU core 102 preferably includes an internal ROM 127 in which the microcode for the CPU 102 is stored. The CPU core 102 is illustrative of, for example, a Pentium compatible microprocessor, with reduced instruction set computer (RISC) operations. The CPU local bus 165 is exemplary of a Pentium compatible style local bus. The CPU local bus 165 includes a set of data lines, a set of address lines, and a set of control lines (not shown individually).

Thus, according to normal convention, the processor 101 couples to other peripheral computer components through one or more external buses, such as system bus 112, peripheral bus 120, and memory bus 117. Various peripheral devices 111, 122 may reside on these busses. As shown in FIG. 1, a removable card slot driver may also reside on the peripheral bus 120 or system bus 112, for receiving a removable card, such as a removable external memory device. The external memory device may comprise, for example, a memory card on which the stored information is magnetically encoded. The external memory device in slot driver 144, or peripheral device 122, may also comprise a CD ROM unit, a disk driver, or a local area network (LAN).

The details of the cache memory 106 and cache controller 108 will now be discussed. Referring still to FIG. 1, each line of cache memory 106 has associated therewith address tag and state information. The address tag indicates a physical address in system memory 114 or in external memory (such as may be present for example in the removable card driver 144) corresponding to each entry within cache memory 106. In this embodiment each entry within cache memory 106 is capable of storing a line of data. A line of data consists of four doublewords (where each doubleword comprises 32 bits). It is understood, however, that a line could contain any number of words or doublewords, depending upon the system. It is further understood that a doubleword could consist of any number of bits.

The state information may, for example, comprise a valid bit and a set of dirty bits. A separate dirty bit is allocated for each doubleword within each line. The valid bit indicates whether a predetermined cache line contains valid cache data, while the dirty bits identify the write status of each double word within each cache line. In an invalid state, there is no valid data in the corresponding cache memory entry. In a valid and clean state, the cache memory 106 entry contains valid data which is inconsistent with system memory 114. Typically, the dirty state results when a cache memory entry is altered by a write operation.

Cache controller 108 includes an address tag and state logic circuit 130 that contains and manages the address tag and state information, and a comparator circuit 132 for determining whether a cache hit has occurred. Although not shown, the cache controller 108 may include other logical elements, including for example a snoop write-back circuit that controls the write-back of dirty data within cache memory 106. It will be appreciated by those skilled in the art that cache controller 108 may contain other additional conventional circuitry to control well-known caching functions such as various read, write, update, invalidate, copyback, and flush operations. Such circuitry may be implemented using a variety of specific circuit configurations. Examples of such specific circuit configurations may be found in a host of publications of the known prior art.

As stated previously, each line of data within cache memory 106 is associated with four doublewords of data. Address tag and state logic circuit 130 indicates a physical address in system memory 114 corresponding to each line entry within cache memory 106, and further stores a valid bit and a set of dirty bits associated with each line of data. A separate dirty bit is provided for each doubleword of data within each line. As will be better understood from the following, the address tag and state logic 130 monitors cycles executing on system bus 112 and detects the initiation of a memory cycle (i.e., read or write cycle) by any alternate bus master device in the computer system 100. It is noted that such a cycle could be initiated by peripheral device 122 or by local bus peripheral 111 (i.e., if configured as DMA controller).

Figure 2:
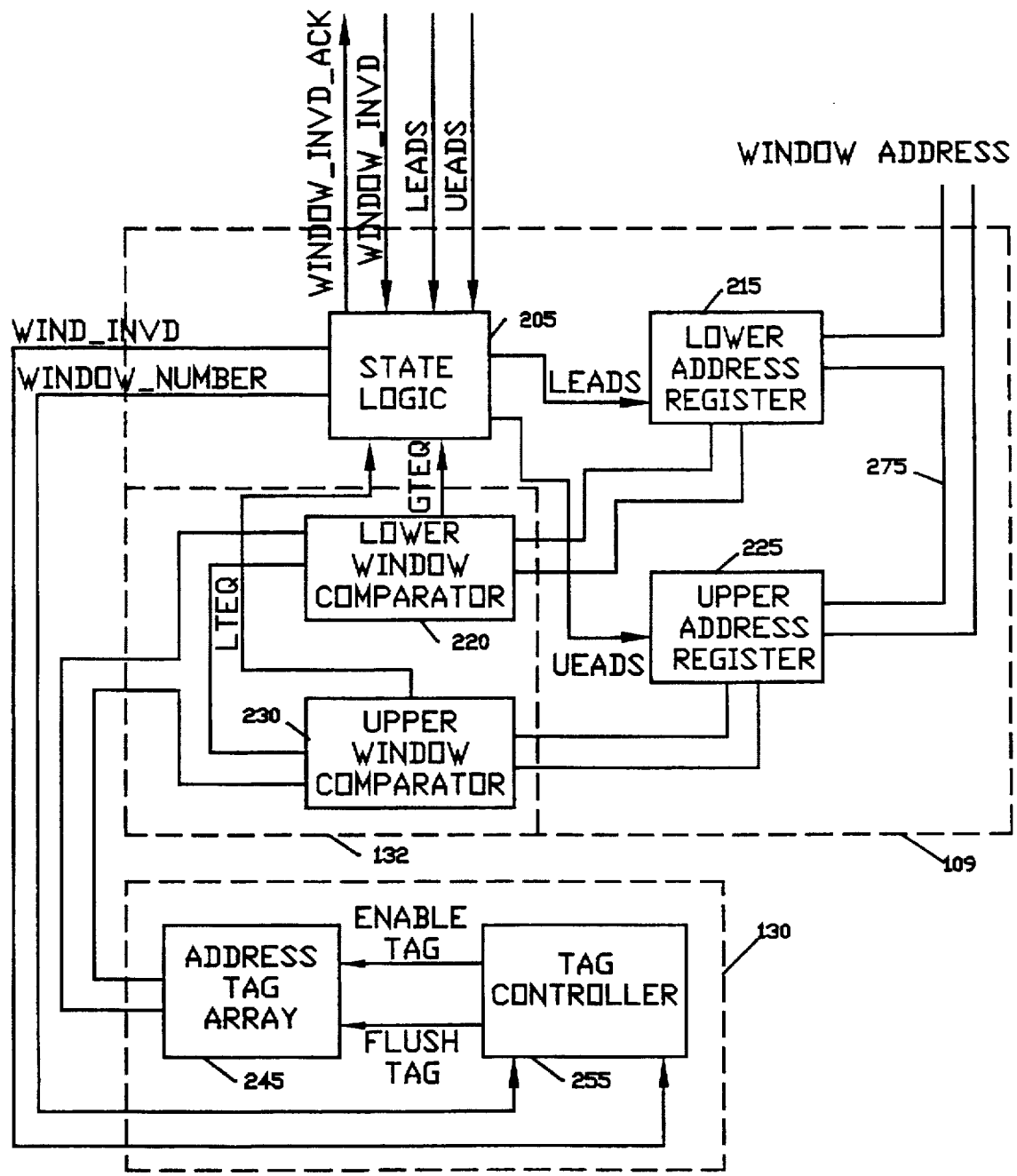
FIG. 2 is a schematic block diagram illustrating a configuration of the local bus interface unit and cache memory controller in accordance with an exemplary embodiment.

Referring now to FIG. 2, portions of the cache controller and local bus interface unit are shown in accordance with the preferred embodiment. One skilled in the art will understand that the portions of the bus interface unit and cache memory shown in FIG. 2 may be located in the CPU core or in other locations on or off chip. FIG. 2, therefore, is merely illustrative of the preferred implementation of the present invention.

As shown in FIG. 2, the local bus interface unit 109 includes state logic 205, a lower address register 215, and an upper address register 225. The lower address register 215 and upper address register 225 receive lower and upper window address values on bus 275 for the external memory device when the external memory device is removed from the system. Bus 275 may comprise either the local bus or the system bus in the configuration of the system shown in FIG. 1. The address registers receive control signals LEADS and UEADS from the state logic 205 to initiate loading of the appropriate window address value. Those values can be obtained from appropriate registers configured in the BIU 110 (FIG. 1), for example.

Similarly, the comparator circuit 132 includes a lower window comparator 220 and an upper window comparator 230, each of which couple to the lower and upper address registers 215, 225, respectively. As one skilled in the art will understand, comparators 220, 230 may be located in the local bus interface 109 or in CPU core 101, if desired. The cache address tag and state logic 130 preferably includes an address tag array 245 and a tag controller 255. The address values stored in the lower and upper address registers 215, 225 are periodically provided as input signals to the associated comparator 220, 230, respectively. The comparator 220, 230 also receives as input signals tag address values from the address tag array 245. The output generated by comparators 220, 230 are relayed to the state logic 205 as signals GTEQ (greater than or equal) from lower window comparator 220, and LTEQ (less than or equal) from upper window comparator 230.

The state logic 205 receives as an input a window invalidate (WINDOW_INVD) signal, which initiates the invalidation process. The state logic also receives a lower enable address (LEADS) signal and an upper enable address (UEADS) signal to indicate that a valid lower or upper window address is being provided on either the system bus or the local bus. In response to receipt of the WINDOW_ INVD signal and the LEADS or UEADS, the state logic 205 enables either the lower address register 215 or the upper address register 225 to capture the window address on the bus 275. The state logic 205 also receives the GTEQ signal from lower window comparator 220, and the LTEQ signal from upper window comparator 230. In response to a hit signal from both comparators, indicating that the tag address is within the external memory window address, the state logic 205 produces an invalidate (WIND_INVD) signal and the tag address number (WINDOW_NUMBER) to the tag controller 255, causing the tag address identified by the WINDOW_NUMBER signal to be flushed from the cache memory. After completion of the partial flush, the state logic generates an acknowledge (WINDOW_INVD_ACK) signal.

Referring still to FIG. 2, the address tag array 245 includes the tag addresses stored in the cache memory. The tag controller 255 controls the generation of the tag addresses, and functions in the preferred embodiment to implement any flushing of tag address values. The tag controller 255 preferably causes the address tag array 245 to sequentially transmit each of the stored tag values to the comparators 220, 230 via the local bus. The comparators 220, 230 receive the tag address values from the address and compare each tag value with the lower and upper window address of the removed external memory, which is obtained from the lower address register 215 and upper address register 225, respectively.

Referring to FIGS. 1 and 2, in an alternative embodiment, the window invalidation may be implemented through instruction in the CPU microcode stored in ROM 127. In this embodiment, the lower and upper address window values are fetched in a software routine and compared with each of the address tag values fetched from the address tag array.

Figure 3:
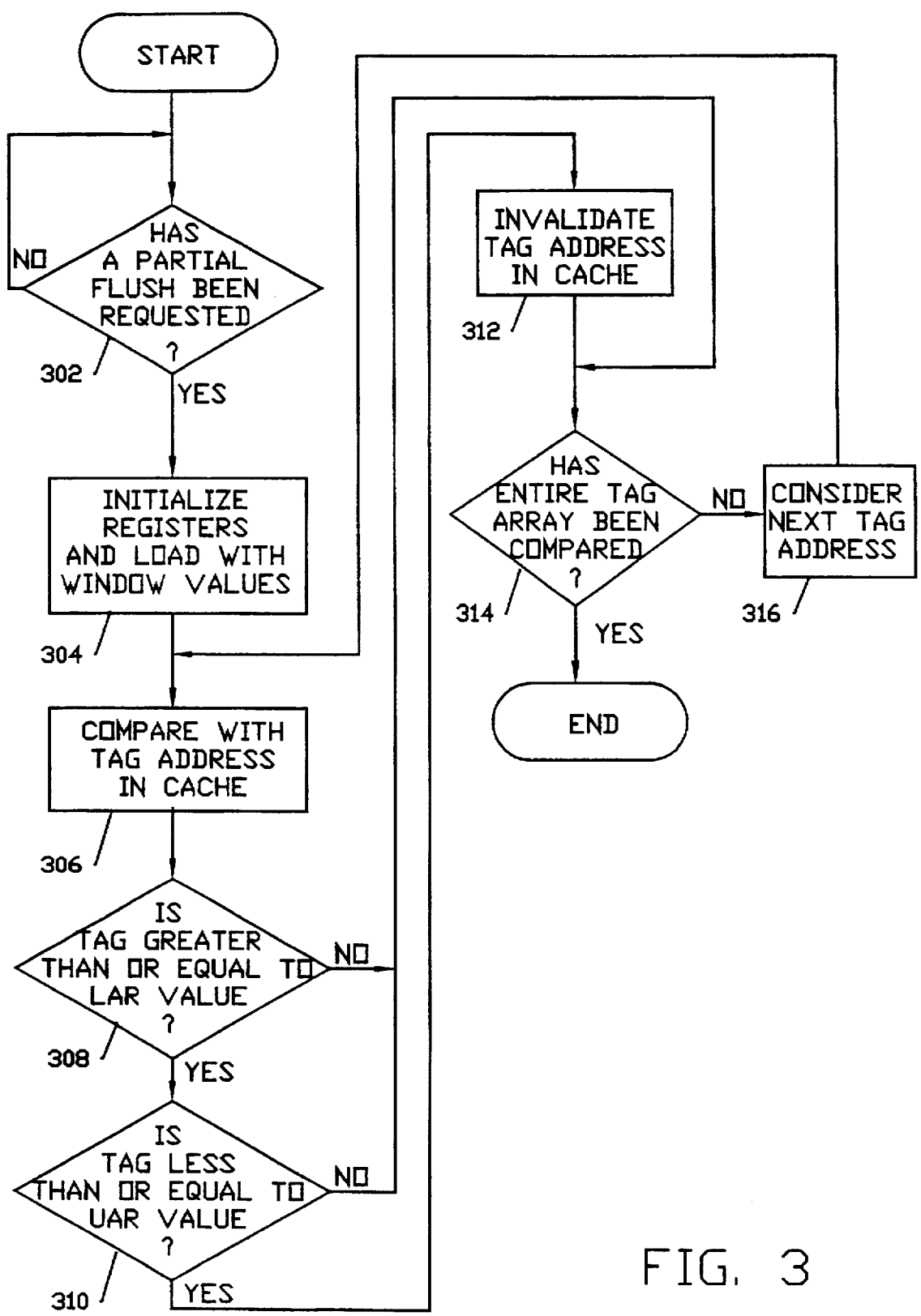
FIG. 3 is flow chart illustrating the preferred process operation to initiate a partial flush of the cache memory.

Referring now to FIGS. 2 and 3, an exemplary process for implementing the present invention now will be described. In step 302, the local bus interface (or alternatively the CPU core) determines if a partial flush has been requested. Typically, such a partial flush will be initiated in response to detecting that an external memory device has been removed from the system, disabled or modified in some fashion. Upon detecting such a condition, the bus interface unit may issue a WINDOW_INVD signal, followed by the lower and upper address values and upper and lower enable address signals (UEADS and LEADS) to load the lower and upper address registers 215, 225 (step 304).

In step 306, the lower and upper address window values are compared in comparators 220, 230 with a tag address obtained from address tag array 245. If the tag address is greater than or equal to the lower address register value (step 308) indicated by the GTEQ signal, and less than or equal to the upper address register value (step 310) indicated by the LTEQ signal, then the state logic 205 transmits an invalidate (WIND_INVD) signal and the address to be invalidated (WINDOW_NUMBER) to the tag controller 255 (step 312). In step 314, the tag controller determines if all tag addresses have been compared to the window address values in registers 215, 225. If all tag address values have not been checked, the tag controller causes the next tag address to be sent to the comparators for comparison with the window values.

Figure 4:
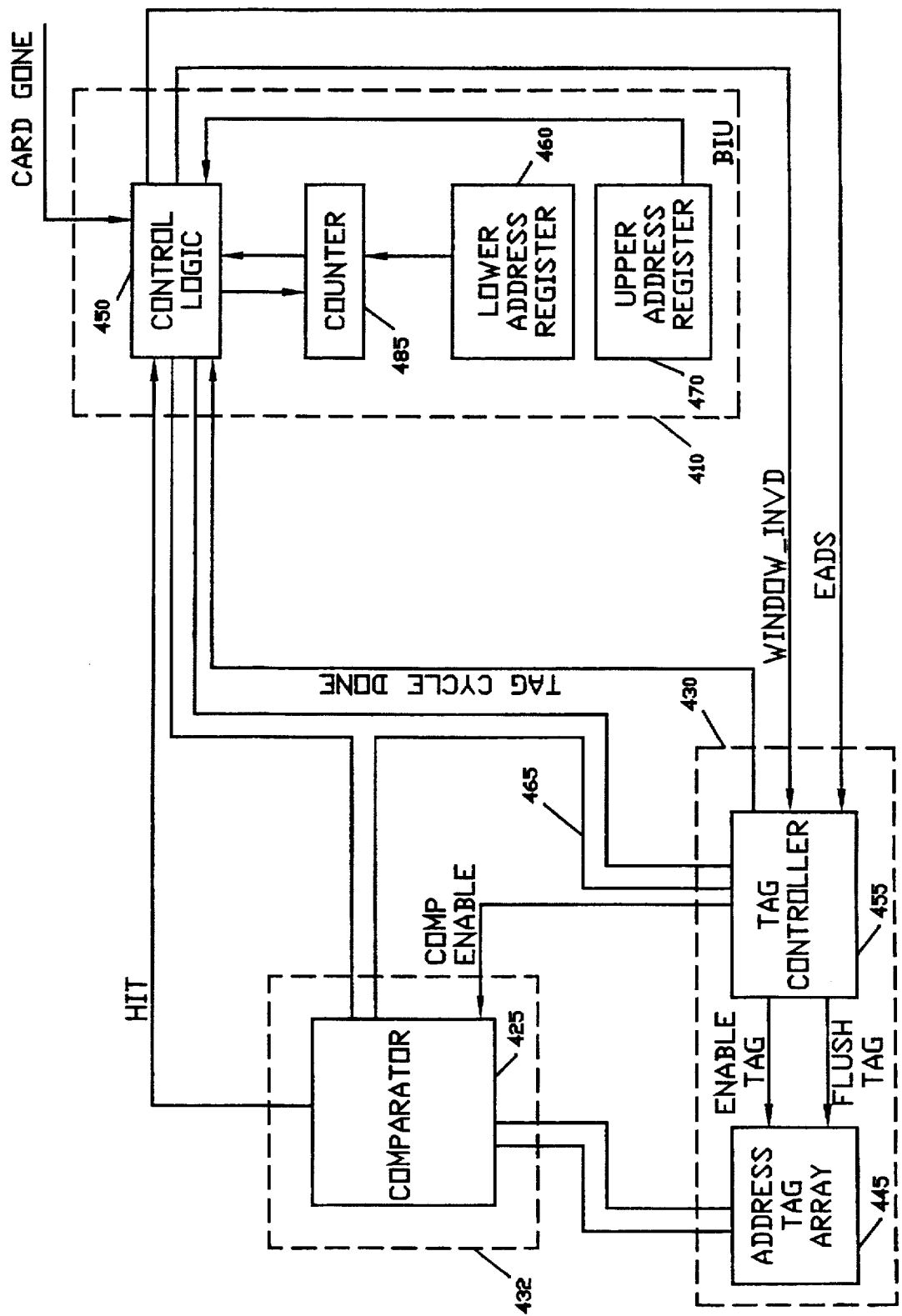
FIG. 4 is a schematic block diagram depicting an alternative embodiment for initiating a partial cache flush through the use of an external bus interface unit.

Referring now to FIG. 4, the cache comparator circuitry 432 and the address tag and logic 430 are shown in isolation with the bus interface unit or BIU 410 interconnected by bus 465. The bus 465 may comprise either a system bus or a local bus for transmitting address values between the BIU 410 and the cache controller logic. In the exemplary embodiment shown in FIG. 4, the BIU 410 generates an address value that is transmitted on bus 465 to comparator circuitry 432 and address tag and logic 430, when a CARD GONE signal is received at BIU 410. The BIU also transmits control (EADS and WINDOW_INVD) signals to the cache controller logic to indicate the presence of a valid address on bus 465, and to request a partial flush of the cache memory. The BIU receives a hit (HIT) signal from comparator circuitry 432.

In the embodiment shown in FIG. 4, the BIU includes a lower address register 460 and an upper address register 470 to specify the memory address window of the removed external memory device. As one skilled in the art will understand, other registers and formats may be used to provide a map of the memory address window values. For example, one or more register(s) may be provided which indicates the start address of the memory values, and an offset for the memory address, which when summed with the start address provides the upper address boundary for the memory.

In the embodiment shown in FIG. 4, a counter 485 receives the start address value from register 460, and then counts sequentially to provide subsequent address values.

The BIU control logic 450 receives the count from counter 485, compares the count with the upper address value determined from register 470 (or from an offset value), and transmits the address value on bus 465 if the count value is within the memory address window. Substantially simultaneously with the assertion of the address signal on buss 465, the control logic 450 also generates the EADS signal to the address tag and state logic 430 to indicate a valid address is on bus 465.

The address tag and state logic 430 includes an address tag array 445 and a tag controller 455. The tag controller receives the control signals from the BIU 410, and generates in response to the EADS signal a comparator enable (COMP ENABLE) signal to permit the comparator circuitry 432 to latch in the address signal appearing on bus 465, and a enable tag (ENABLE TAG) signal to cause address tag array 445 to transmit an address tag value to comparator circuitry 432. The address tag array 445 preferably transmits each tag array value in sequence in response to enable signals from the controller 455. In response to the assertion of the WINDOW_INVD signal, the tag controller 455 flushes the particular tag address appearing on bus 465.

Comparator circuitry 432 includes a comparator 425 for receiving address values from the BIU 410 and the address tag array. The comparator 425 is enabled by an appropriate control signal from tag controller 455 (or alternatively from BIU 410). If the comparator determines that the address values are equal, it generates a hit (HIT) signal that is transmitted to control logic 450.

The operation of the BIU initiated flush will now be described with reference to the exemplary embodiment of FIG. 4. When an external card is removed from the computer system, or when a system component is modified or disabled, a CARD GONE or similar signal is provided to the BIU 450. The control logic 450 initializes counter 485, causing it to load the start address for the device which has been removed, disabled or modified. This start address is transmitted on bus 465, at substantially the same time that the EADS signal is asserted. The tag controller enables the comparator to load the address value, while also enabling the address tag array to begin transmitting tag address values to the comparator 425. The comparator 425 compares each of the tag address values with the address value from the BIU 410. If a match is found, the HIT signal is transmitted to the control logic 450, which in turn sends an invalidate (WINDOW_INVD) signal to the controller to flush this particular tag address value. If no match is found for any address tag, the tag controller sends a TAG CYCLE DONE signal to the control logic to indicate that all address tags have ben compared.

The control logic then increments the counter 485, and if the new value is not above the value in the upper address register 470, transmits this new address value to the comparator 425 to perform a new comparison with each address tag value. This operation continues until all address values in the removed memory device have been considered.

Numerous variations and modifications will become apparent to those skilled in the art once the above disclosure is fully appreciated. It is intended that the following claims be interpreted to embrace all such variations and modifications.

What is claimed is:

1. A computer system comprising:

a bus capable of transferring data, address and control signals;

a processing unit coupled to said bus, said processing unit including a cache memory and a cache controller;

a system memory;

a system memory controller operatively coupled to said bus and to said system memory for controlling the storage and retrieval of data within said system memory;

an external memory device for supplementing system memory;

a bus interface unit operatively coupled to said bus for controlling the storage and retrieval of data within the external memory device;

wherein said processing unit is capable of selectively invalidating certain contents of cache memory in response to removal, modification, or disabling of said external memory device, wherein said bus interface unit includes a lower address register and an upper address register for defining the lower and upper bounds of the external memory address values.

2. The computer system of claim 1, wherein said processing unit includes a microcode ROM with instructions to partially flush the cache memory in response to removal, modification or disabling of said external memory device.

3. The computer system of claim 1, wherein said cache controller includes an address tag array containing a list of all addresses for which data is stored in the cache memory.

4. The computer system of claim 3, wherein said cache controller includes an upper comparator for comparing the upper address value in said upper address register to each address in the address tag array.

5. The computer system of claim 4, wherein said cache controller includes a lower comparator for comparing the lower address value in said lower address register to each address in the address tag array.

6. The computer system of claim 5, wherein an address is invalidated if the address is greater than or equal to the address in the lower address register and less than or equal to the address in the upper address register.

7. A computer system comprising:

a CPU core for selectively invalidating the contents of a cache memory;

a bus operatively coupled to said CPU core and capable of transferring data, address and control signals;

a system memory;

a system memory controller operatively coupled to said bus and to said system memory for controlling the storage and retrieval of data within said system memory;

a cache controller operatively coupled to said bus for controlling the storage and retrieval of data within said cache memory;

a bus interface unit operatively coupled to said bus for controlling the storage and retrieval of data within an external memory device;

wherein said cache controller comprises a tag array containing a list of all addresses stored in said cache memory; and wherein said bus interface unit includes a map of external memory and compares each value in said map with each address stored in said tag array.

8. The system of claim 7, wherein said CPU core includes a microcode ROM with instructions to implement a partial flushing of the cache memory.

* * * * *